United States Patent
Wu et al.

(10) Patent No.: US 11,749,264 B2
(45) Date of Patent: Sep. 5, 2023

(54) SYSTEM AND METHODS FOR TRAINING TASK-ORIENTED DIALOGUE (TOD) LANGUAGE MODELS

(71) Applicant: salesforce.com, inc., San Francisco, CA (US)

(72) Inventors: Chien-Sheng Wu, Singapore (SG);
Chu Hong Hoi, Singapore (SG);
Richard Socher, Menlo Park, CA (US);
Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 165 days.

(21) Appl. No.: 17/088,206

(22) Filed: Nov. 3, 2020

(65) Prior Publication Data
US 2022/0139384 A1    May 5, 2022

(51) Int. Cl.
*G10L 15/18*    (2013.01)
*G10L 15/06*    (2013.01)

(52) U.S. Cl.
CPC ........ *G10L 15/1815* (2013.01); *G10L 15/063* (2013.01); *G10L 15/1822* (2013.01)

(58) Field of Classification Search
CPC .................. G10L 15/1815; G10L 15/063; G10L 15/1822
See application file for complete search history.

(56) References Cited

U.S. PATENT DOCUMENTS

| | | | |
|---|---|---|---|
| 2010/0131274 A1* | 5/2010 | Stent | G10L 15/08 |
| | | | 704/E15.001 |
| 2017/0011738 A1* | 1/2017 | Senior | G10L 15/063 |
| 2020/0043480 A1* | 2/2020 | Shen | G10L 15/22 |
| 2020/0110915 A1* | 4/2020 | Long | G06F 40/56 |
| 2020/0152182 A1* | 5/2020 | Steedman Henderson | |
| | | | G06F 40/30 |
| 2022/0084510 A1* | 3/2022 | Peng | G06F 40/30 |

FOREIGN PATENT DOCUMENTS

CN    110543639 A    12/2019

OTHER PUBLICATIONS

Devlin et al., "BERT: Pre-training of Deep Bidirectional Transformers for Language Understanding" arXiv preprint arXiv:1810.04805 (2018). (Year: 2018).*

(Continued)

*Primary Examiner* — Bhavesh M Mehta
*Assistant Examiner* — Edward Tracy, Jr.
(74) *Attorney, Agent, or Firm* — Haynes and Boone, LLP

(57) ABSTRACT

Embodiments described herein provide methods and systems for training task-oriented dialogue (TOD) language models. In some embodiments, a TOD language model may receive a TOD dataset including a plurality of dialogues and a model input sequence may be generated from the dialogues using a first token prefixed to each user utterance and a second token prefixed to each system response of the dialogues. In some embodiments, the first token or the second token may be randomly replaced with a mask token to generate a masked training sequence and a masked language modeling (MLM) loss may be computed using the masked training sequence. In some embodiments, the TOD language model may be updated based on the MLM loss.

24 Claims, 11 Drawing Sheets

(56) References Cited

OTHER PUBLICATIONS

Wu, Chien-Sheng, et al. "TOD-BERT: Pre-trained natural language understanding for task-oriented dialogue." arXiv preprint arXiv: 2004.06871 (2020). (Year: 2020).*

Jiang, Dongwei, et al. "Improving transformer-based speech recognition using unsupervised pre-training." arXiv preprint arXiv: 1910.09932 (2019). (Year: 2019).*

International Search Report and Written Opinion for PCT/US2021/057846, dated Feb. 24, 2022, 14 pages.

Qian et al, "Human Versus Machine and Human-Machine Teaming on Masked Language Modeling Tasks", Oct. 17, 2020, Computer Vision—ECCV2020 : 16th European Conference, Glasgow, UK, Aug. 23-28, 2020 Proceedings; Part f The Lecture Notes In Computer Science,Lecture Notes In Computer Science; Lect. Notes Computer, Springer International PU, pp. 504-516.

Wu et al."Emerging Cross-lingual. Structure in Pretrained Language Models", Database Inspec [Online],The Institution of Electrical Engineers, Stevenage, Gb; Nov. 4, 2019, Database accession No. 1954728, abstract, 1 page.

Henderson et al., "Convert: Efficient and accurate conversational representations from transformers," arXiv preprint arXiv:1911.03688, 2019, 15 pages.

Saeidi et al., "The effect of negative sampling strategy on capturing semantic similarity in document embeddings," Proceedings of the 2nd Workshop on Semantic Deep Learning (SemDeep-2), 2017, pp. 1-8.

Henderson et al., "Training neural response selection for task-oriented dialogue systems," Proceedings of the 57th Annual Meeting of the Association for Computational Linguistics, 2019, pp. 5392-5404.

Radford et al., "Language models are unsupervised multitask learners," https://d4mucfpksywv.cloudfront.net/better-language-models/language-models.pdf, 2018, 24 pages.

Zhang et al., "Dialogpt: Large-scale generative pre-training for conversational response generation," arXiv preprint arXiv:1911.00536, 2019, 10 pages.

Devlin et al., "BERT: Pre-training of Deep Bidirectional Transformers for Language Understanding," arXiv preprint arXiv:1810.04805, 2018, 14 pages.

* cited by examiner

|  |  | MWOZ | | DSTC2 | | GSIM | |
|---|---|---|---|---|---|---|---|
|  |  | 1-to-100 | 3-to-100 | 1-to-100 | 3-to-100 | 1-to-100 | 3-to-100 |
| 1% Data | BERT | 7.8% ± 2.0% | 20.5% ± 4.4% | 1.0% ± 0.1% | 3.6% ± 0.4% | 2.4% ± 0.4% | 6.6% ± 0.8% |
|  | TOD-BERT-mlm | 13.0% ± 1.1% | 34.6% ± 0.4% | 1.5% ± 0.5% | 4.4% ± 1.5% | 6.2% ± 5.1% | 14.8% ± 3.5% |
|  | TOD-BERT-jnt | - | - | 4.8% ± 0.6% | 12.2% ± 1.0% | 15.1% ± 1.5% | 29.5% ± 1.5% |
| 10% Data | BERT | 20.9% ± 2.6% | 45.4% ± 3.8% | 3.3% ± 0.6% | 9.8% ± 1.6% | 8.5% ± 1.0% | 21.6% ± 1.7% |
|  | TOD-BERT-mlm | 22.3% ± 3.2% | 48.7% ± 4.0% | 3.5% ± 0.7% | 10.5% ± 2.2% | 13.2% ± 3.8% | 27.8% ± 5.2% |
|  | TOD-BERT-jnt | - | - | 8.0% ± 0.3% | 19.4% ± 0.3% | 27.5% ± 0.7% | 46.0% ± 0.9% |
| Full Data | GPT2 | 47.5% | 75.4% | 7.9% | 21.1% | 37.5% | 60.1% |
|  | DialoGPT | 35.7% | 64.1% | 7.5% | 19.5% | 18.5% | 41.1% |
|  | BERT | 42.5% | 75.5% | 7.3% | 19.4% | 20.8% | 43.6% |
|  | TOD-BERT-mlm | 48.1% | 74.3% | 7.8% | 20.7% | 37.9% | 60.1% |
|  | TOD-BERT-jnt | 65.8% | 87.0% | 12.3% | 27.8% | 44.6% | 65.8% |

FIG. 4

| | | MWOZ (13) | | DSTC2 (19) | | GSIM (13) | |
|---|---|---|---|---|---|---|---|
| | | micro-F1 | macro-F1 | micro-F1 | macro-F1 | micro-F1 | macro-F1 |
| 1% Data | BERT | 84.0% ± 0.6% | 66.7% ± 1.7% | 83.9% ± 0.3% | 19.4% ± 0.4% | 78.7% ± 5.7% | 32.0% ± 4.0% |
| | TOD-BERT-mlm | 87.5% ± 0.6% | 73.3% ± 1.5% | 85.0% ± 0.4% | 20.7% ± 1.2% | 87.7% ± 1.6% | 38.2% ± 1.0% |
| | TOD-BERT-jnt | 86.9% ± 0.2% | 72.4% ± 0.8% | 85.4% ± 0.4% | 19.8% ± 0.2% | 87.0% ± 1.6% | 38.6% ± 1.1% |
| 10% Data | BERT | 89.7% ± 0.2% | 78.4% ± 0.3% | 87.2% ± 0.4% | 31.2% ± 1.4% | 98.6% ± 0.1% | 45.2% ± 0.0% |
| | TOD-BERT-mlm | 90.1% ± 0.2% | 78.9% ± 0.1% | 88.8% ± 0.1% | 31.5% ± 0.4% | 98.5% ± 0.4% | 45.1% ± 0.3% |
| | TOD-BERT-jnt | 90.2% ± 0.2% | 79.6% ± 0.7% | 89.7% ± 0.0% | 32.6% ± 0.2% | 98.9% ± 0.1% | 45.4% ± 0.0% |
| Full Data | MLP | 81.6% | 45.5% | 77.6% | 18.1% | 89.5% | 26.1% |
| | RNN | 90.4% | 77.3% | 90.8% | 20.4% | 88.4% | 45.2% |
| | GPT2 | 90.8% | 70.8% | 91.2% | 31.3% | 99.1% | 45.5% |
| | DialoGPT | 91.2% | 79.7% | 87.9% | 28.9% | 99.1% | 45.6% |
| | BERT | 91.4% | 79.7% | 91.3% | 35.2% | 98.9% | 45.4% |
| | TOD-BERT-mlm | 91.7% | 79.9% | 91.5% | 38.4% | 99.1% | 45.5% |
| | TOD-BERT-jnt | 91.7% | 80.6% | 91.6% | 35.8% | 99.6% | 45.8% |

| | Model | Joint Acc | Slot Acc |
|---|---|---|---|
| 1% Data | BERT | 6.4% ± 1.4% | 84.4% ± 1.0% |
| | TOD-BERT-mlm | 9.9% ± 0.6% | 86.6% ± 0.5% |
| | TOD-BERT-jnt | 8.0% ± 1.0% | 85.3% ± 0.4% |
| 5% Data | BERT | 19.6% ± 0.1% | 92.0% ± 0.5% |
| | TOD-BERT-mlm | 28.1% ± 1.6% | 93.9% ± 0.1% |
| | TOD-BERT-jnt | 28.6% ± 1.4% | 93.8% ± 0.3% |
| 10% Data | BERT | 32.9% ± 0.6% | 94.7% ± 0.1% |
| | TOD-BERT-mlm | 39.5% ± 0.7% | 95.6% ± 0.1% |
| | TOD-BERT-jnt | 37.0% ± 0.1% | 95.2% ± 0.1% |
| 25% Data | BERT | 40.8% ± 1.0% | 95.8% ± 0.1% |
| | TOD-BERT-mlm | 44.0% ± 0.4% | 96.4% ± 0.1% |
| | TOD-BERT-jnt | 44.3% ± 0.3% | 96.3% ± 0.2% |
| Full Data | DSTReader* | 36.4% | - |
| | HyST* | 38.1% | - |
| | ZSDST* | 43.4% | - |
| | TRADE* | 45.6% | - |
| | GPT2 | 46.2% | 96.6% |
| | DialoGPT | 45.2% | 96.5% |
| | BERT | 45.6% | 96.6% |
| | TOD-BERT-mlm | 47.7% | 96.8% |
| | TOD-BERT-jnt | 48.0% | 96.9% |

FIG. 6

|  | Model | Acc (all) | Acc (in) | Acc (out) | Recall (out) |
|---|---|---|---|---|---|
| 1-Shot | BERT | 29.3% ± 3.4% | 35.7% ± 4.1% | 81.3% ± 0.4% | 0.4% ± 0.3% |
|  | TOD-BERT-mlm | 38.9% ± 6.3% | 47.4% ± 7.6% | 81.6% ± 0.2% | 0.5% ± 0.2% |
|  | TOD-BERT-jnt | 42.5% ± 0.1% | 52.0% ± 0.1% | 81.7% ± 0.1% | 0.1% ± 0.1% |
| 10-Shot | BERT | 75.5% ± 1.1% | 88.6% ± 1.1% | 84.7% ± 0.3% | 16.5% ± 1.7% |
|  | TOD-BERT-mlm | 76.6% ± 0.8% | 90.5% ± 1.2% | 84.3% ± 0.2% | 14.0% ± 1.3% |
|  | TOD-BERT-jnt | 77.3% ± 0.5% | 91.0% ± 0.5% | 84.5% ± 0.4% | 15.3% ± 2.1% |
| Full (100-Shot) | FastText |  | 89.0% |  | 9.7% |
|  | SVM* |  | 91.0% |  | 14.5% |
|  | CNN* |  | 91.2% |  | 18.9% |
|  | GPT2 | 83.0% | 94.1% | 87.7% | 32.0% |
|  | DialoGPT | 83.9% | 95.5% | 87.6% | 32.1% |
|  | BERT | 84.9% | 95.8% | 88.1% | 35.6% |
|  | TOD-BERT-mlm | 85.9% | 96.1% | 89.5% | 46.3% |
|  | TOD-BERT-jnt | 86.6% | 96.2% | 89.9% | 43.6% |

|  | Domain (acc) | Intent (acc) | Dialogue Act (F1-micro) |
|---:|:---:|:---:|:---:|
| GPT2 | 63.5% | 74.7% | 85.7% |
| DialoGPT | 63.0% | 65.7% | 84.2% |
| BERT | 60.5% | 71.1% | 85.3% |
| TOD-BERT-mlm | 63.9% | 70.7% | 83.5% |
| TOD-BERT-jnt | 68.7% | 77.8% | 86.2% |

FIG. 8

SYSTEM AND METHODS FOR TRAINING TASK-ORIENTED DIALOGUE (TOD) LANGUAGE MODELS

TECHNICAL FIELD

The present disclosure relates generally to machine learning models and neural networks, and more specifically, to training task-oriented dialogue (TOD) language models.

BACKGROUND

Neural networks have been used to generate conversational responses and thus conduct a dialogue with a human user. For example, a human user can engage in a conversation with an intelligent assistant to gather information on a specific topic, to perform a task such as booking travel tickets, making restaurant reservations, and/or the like. However, existing task-oriented dialogue language models, which are trained based on massive scale of general text corpora, such as English Wikipedia or books, or using chit-chat corpora from social media such as Twitter® or Reddit®, have shown deficiencies when applied to conversational or task-oriented dialogues (TODs). The deficiencies stem, at least in part, from the intrinsic differences in linguistic patterns between human conversations and the written text or the short, noisy and "task-less" nature of chit-chat corpora.

BRIEF DESCRIPTION OF THE DRAWINGS

FIG. 4 shows an example data table illustrating performance comparison between various language models including TOD language models trained on task-oriented datasets with respect to the downstream task of response selection, according to one embodiment.

FIG. 5 shows an example data table illustrating performance comparison between various language models including TOD language models trained on task-oriented datasets with respect to the downstream task of dialogue act prediction, according to one embodiment.

FIG. 6 shows an example data table illustrating performance comparison between various language models including TOD language models trained on task-oriented datasets with respect to the downstream task of dialogue state tracking, according to one embodiment.

FIG. 7 shows an example data table illustrating performance comparison between various language models including TOD language models trained on task-oriented datasets with respect to the downstream task of intent detection, according to one embodiment.

FIG. 8 shows an example data table illustrating performance comparison between various language models including TOD language models trained on task-oriented datasets with respect to multiple downstream tasks, according to one embodiment.

Figure 1:
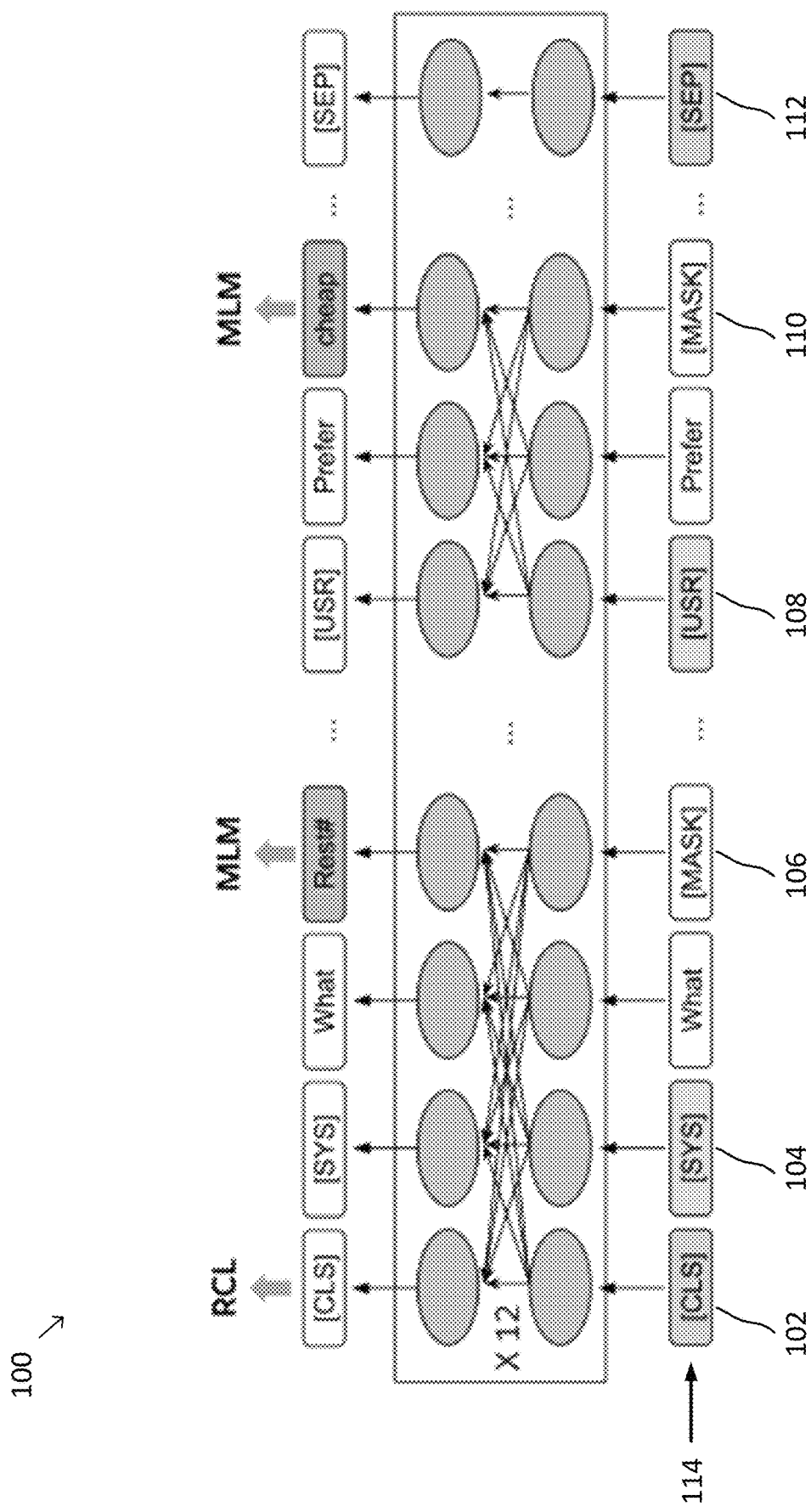
FIG. 1 is a block diagram illustrating an example architecture for training TOD language models with task-oriented datasets, according to one embodiment described herein.

In the figures and appendix, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Task-oriented dialogues (TODs) are directed to specific tasks or have specific goals, examples of which include restaurant reservations, ticket bookings, weather information retrieval, calendar scheduling, point-of-interest navigation, etc. As such, TOD language models are designed to assist users to accomplish the specific tasks or goals (in contrast to, for example, open-domain dialogue systems that are primarily directed to maximizing user engagement). Existing approaches generally pre-train TOD language models with non-task-oriented training datasets, such as non-TOD general text (e.g., obtained from English language Wikipedia™), conversational corpora such as texts obtained from Twitter™ or Reddit™, and/or the like. These non-task-oriented pre-training of TOD language model, however, result in subpar performance, largely due to underlying linguistic differences between the non-task-oriented training datasets and real-world TODs. For example, corpora obtained from open-domain dialogue systems such as Twitter™ or Reddit™ can be informative or debatable around a topic, but may not be geared towards specific goals or tasks. Thus, there is a need for methods and systems to improve the pre-training of TOD language models.

In view of the dissatisfactory performance of existing pre-training mechanism of TOD language models, some embodiments of the present disclosure disclose pre-training a TOD language model using one or more English-based task-oriented training datasets, which may include human-human and/or multi-turn TOD corpora. Specifically, the user utterance and system response of the dialogue of the task-oriented training data sets may be prepared to form an input training sequence by prefixing a start token to each and concatenating the pair of user utterance and system response. The input sequence may be used to pre-train the TOD language model via masked language loss. In some embodiments, different sets of dialogues may be selected for contrastive learning.

In some cases, the TOD language model may not be pre-trained with open-domain dialogue system corpora. That is, the TOD language model may be pre-trained using task-oriented training datasets (e.g., excluding corpora obtained from Twitter™ or Reddit™) only. In some cases, the one or more task-oriented training datasets used to pre-train the TOD language model may include multiple task-oriented training datasets, and some of these multiple task-oriented training datasets may be particularly configured (e.g., but not necessarily exclusively configured) for use in pre-training the TOD language model in specific tasks. For example, a task-oriented training dataset may be particularly configured (e.g., but not necessarily exclusively configured) for use in pre-training the TOD language model in one or more task-oriented downstream tasks. Non-limiting examples of task-oriented downstream tasks include intention detection, dialogue state tracking, dialogue act prediction and response selection.

In some embodiments, an example TOD language model can be a task-oriented dialogue bi-directional encoder representations from transformers (referred herein as TOD BERT) language model, which is based on BERT, a masked language model discussed in Devlin et al., arXiv preprint arXiv:1810.04805 (2018), which is hereby expressly incorporated herein by reference in its entirety. It is to be noted that TOD BERT is an example TOD language model, and embodiments of the present disclosure related to the pre-training of a TOD BERT with one or more task-oriented training datasets equally applies to any other TOD language model as well. In some embodiments, the BERT on which the TOD BERT depends may be BERT-base uncased model, which is a transformer self-attention encoder with 12 layers and 12 attention heads with its hidden size $d_B$=768.

In some embodiments, to pre-train TOD BERT with one or more task-oriented training datasets, the one or more task-oriented training datasets may be processed as follows. In some implementations, the dialogues in the task-oriented datasets may be converted or flattened into a flat sequence by including tokens representing the user utterances and system responses of the dialogues. For example, a dialogue may include multiple turns, where each turn t may include a user utterance $U_t$ and a system response $S_t$. A dialogue D that includes n turns can then be represented by D={$S_1$, $U_1$, . . . , $S_n$, $U_n$}, where n is the number of dialogue turns and each $U_i$ or $S_i$ contains a sequence of words of the user utterances or system responses, respectively. In some instances, the flat sequence may be formed based on the dialogue D by pre-fixing each user utterance $U_i$ with a user token [USR] and each system response $S_i$ with a system token [SYS], and concatenating the prefixed user utterances and systems responses into the flat sequence. In some embodiments, sequences from different sentences may be separated by a separation token [SEP] and each sequence may be pre-fixed with a classification token [CLS]. For instance, the dialogue including the user utterance $U_1$ and the system response $S_1$ may be flattened into a flat sequence as follows: "[CLS][USR]$U_1$[SEP][SYS]$S_1$[SEP] . . . ".

In some embodiments, a TOD BERT language model can be pre-trained with one or more task-oriented training datasets using one or more loss functions. An example of the one or more loss functions can be the masked language modeling (MLM) loss. In MLM, a random sample of tokens in the input sequence may be selected and replaced with a mask token [MASK], and the MLM loss function may then be the cross-entropy loss on predicting the masked tokens. In some embodiments, random masking and replacement may be performed once in the beginning and saved for the duration of the training. In some embodiments, token masking may be performed dynamically during batch training.

FIG. 1 shows an example illustration of an input sequence 114 including a class token [CLS] 102 preceding the input sequence 114, a system token [SYS] 104 prefixing a system response (starting with the term "what"), a first mask token [MASK] 106 masking a first token selected for masking, a user token [USR] 108 prefixing a user utterance (starting with the term "prefer"), a second mask token [MASK] 110 masking a second token selected for masking and a separation token [SEP] 112 separating the preceding sentence from a next one. In some embodiments, the MLM loss function can be expressed as $L_{mlm} = -\Sigma_{m=1}^{M} \log P(x_m)$, where M is the total number of masked tokens and $P(x_m)$ is the predicted probability of the token $x_m$ over the vocabulary size.

In some embodiments, an example of the one or more loss functions can be the response contrastive loss (RCL) objective function. In some cases, pre-training TOD language models with RCL may be advantageous because RCL may not require any additional human annotation and allow for an improved representation for the [CLS] token. Further, RCL may facilitate for a TOD language model (e.g., TOD BERT language model) to capture, among other things, under-lying dialogue sequential order, structure information, and response similarity.

In some embodiments, the RCL may be formulated by applying a dual-encoder approach and simulating multiple negative samples. Details of the dual-encoder approach may be found in Henderson et al., *Convert: Efficient and accurate conversational representations from transformers*, arXiv: 1911.03688, 2019, the disclosure of which is incorporated by reference herein in its entirety. In some embodiments, the RCL may be formulated differently than the approach for deriving the next sentence prediction (NSP) objective where two segments A and B are concatenated to predict whether they are consecutive text with a binary classification. In some, in formulating the RCL, a batch of dialogues {$D_1$, . . . , $D_b$} may be drawn and each dialogue may be split at a randomly selected turn t. For example, a dialogue $D_1$ may be separated into two segments, where one may be the context {$S_1^1$, $U_1^1$, . . . , $S_t^1$, $U_t^1$} and the other may be the response {$S_{t+1}^1$}. The TOD BERT language model may then be used to separately encode all the contexts and their corresponding responses, which can then be used to obtain a context matrix $C \in \mathbb{R}^{b \times d_B}$ and a response matrix $R \in \mathbb{R}^{b \times d_B}$ by taking the output [CLS] representations from the b dialogues. In some embodiments, the other responses in the same batch may be treated as randomly selected negative samples. The RCL objective function may then be expressed as $L_{rcl} = -\Sigma_{i=1}^{b} \log M_{i,i}$, where $M = \text{Softmax}(CR^T) \mathbb{R}^{b \times b}$.

In some embodiments, the batch size may be related to the performance of the pre-trained TOD BERT language model on the afore-mentioned downstream tasks. For example, the batch size may be increased to improve the performance of the pre-trained TOD BERT language model on downstream tasks, such as but not limited to response selection. In some instances, the batch size may be increased by changing the positive and negative ratio in the contrastive learning. In some instances, batch size can be a hyper-parameter that may be limited by hardware. In some embodiments, the negative sampling during pre-training can be local sampling (e.g., instead of or in addition to random sampling), discussed in Saeidi et al., *The effect of negative sampling strategy on capturing semantic similarity in document embeddings*, Proceedings of the 2$^{nd}$ Workshop on Semantic Deep Learning (SemDeep-2), pp. 1-8, 2017, the disclosure of which is incorporated by reference herein in its entirety.

In some embodiments, one of the one or more loss functions (e.g., the MLM loss function) can be used to pre-train the TOD BERT language model. In some embodiments, the one or more loss functions can be combined into one loss function and the one combined loss function may be used for pre-training the TOD BERT language model. For example, in some embodiments, the combined loss function can be a weighted-sum of the MLM loss function $L_{mlm}$ and the RCL objective function $L_{rcl}$. In some embodiments, the TOD BERT language model can be pre-trained with the combined loss function (e.g., the weighted-sum of the MLM loss function $L_{mlm}$ and the RCL objective function $L_{rcl}$) by using an optimizer (e.g., an AdamW optimizer) with a dropout ratio 0.1 on all layers and attention weights. In some embodiments, the learning rate may be reduced without a warm-up period. In some embodiments, a neural network activation function (e.g., Gaussian Error Linear Unit (GELU) activation function) may be used during the pre-training of the TOD BERT language model. In some instances, the pre-training of the TOD BERT language model may be early-stopped using perplexity scores of a held-out development set.

Figure 2:
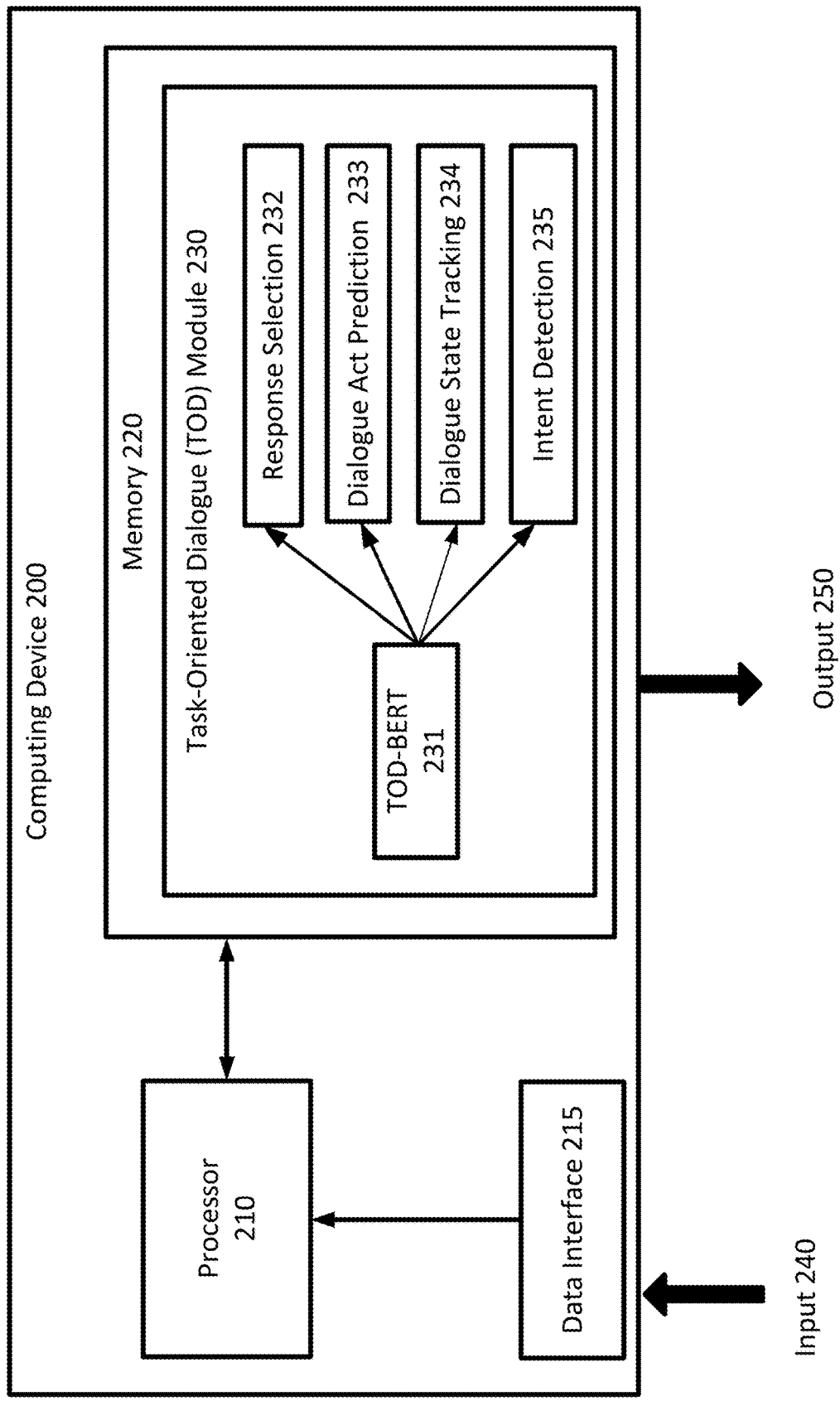
FIG. 2 provides a simplified diagram of a computing device for training task-oriented dialogue (TOD) language models with task-oriented datasets, according to one embodiment described herein.

FIG. 2 provides a simplified diagram of a computing device for implementing and/or pre-training TOD language models with task-oriented datasets, according to some embodiments described herein. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for a TOD module 230 that may be used to implement and/or emulate the systems and models, and/or to implement any of the methods described further herein. In some examples, the TOD module 230 may receive an input 240 such as but not limited to task-oriented training datasets via a data interface 215. The data interface 215 may be any of a user interface that receives the user utterance, or a communication interface that may receive or retrieve a system response. The TOD module 330 may generate an output 350 such as a selected response for the context of the input conversation history.

In some embodiments, to pre-train TOD BERT 231, the TOD module 230 may receive input 240 which may include task-oriented datasets, and process the received datasets as discussed above (e.g., including but not limited to converting or flattening dialogues into a flat sequence by using tokens representing user utterances and system responses of the dialogues). In some embodiments, one or more of the task-oriented datasets may also be used for accomplishing downstream tasks, instead of or in addition to for pre-training TOD BERT 231. In some embodiments, the task-oriented datasets may include English-based human-human dialogues with multi-turns. Examples of the datasets include the Meta-Learning Wizard-of-Oz dataset ("MetaLWOZ") designed to train models to predict user responses in unseen domains. This large dataset was created by crowdsourcing 37,884 goal-oriented dialogs, covering 227 tasks in 47 domains. Another dataset is a schema-guided dialogue ("Schema") which has 22,825 dialogues and provides a challenging testbed for several downstream tasks, in particular, dialogue state tracking. Each schema is a set of tracking slots and each domain could have multiple possible schemas. This allows a single dialogue system to support a large number of services and facilitates the simple integration of new services without requiring much training data.

Other examples of task-oriented datasets that may be included as input 240 for use in pre-training TOD BERT 231 and for accomplishing downstream tasks include so-called Taskmaster, which includes 13,215 dialogues comprising six domains, including 5,507 spoken and 7,708 written dialogs created with two distinct procedures. One is a two-person Wizard of Oz approach that one person acts like a robot and the other is a self-dialogue approach in which crowdsourced workers wrote the entire dialog themselves. It has 22.9 average conversational turns in a single dialogue, which is the longest among all task-oriented datasets considered herein. Another task-oriented dataset is the Multi-Domain Wizard-of-Oz (MWOZ) dataset which contains has 8420/1000/1000 dialogues for train, validation, and test sets, respectively. Across seven different domains, in total it has 30 (domain, slot) pairs that need to be tracked in the test set. A related dataset is MWOZ 2.1 that has same dialogue transcripts but improved state label annotations. And yet another task-oriented dataset can be the Microsoft end-to-end (MSR-E2E) dialogue challenge that has 10,087 dialogues in three domains, movie-ticket booking, restaurant reservation, and taxi booking. The dataset also includes an experiment platform with built-in simulators in each domain.

And yet other examples of task-oriented datasets include the out-of-scope intent dataset ("OOS"), the dialogue state tracking challenge 2 ("DSTC2") and the Google Simulated dataset ("GSIM"). The OOS dataset includes 15,100/3,100/5,500 samples for the train, validation, and test sets, respectively, and covers 151 intent classes over 10 domains, including 150 in-scope intent and 1 out-of-scope intent. The out-of-scope intent means that a user utterance does not fall into any of the predefined intents. Each of the intents has 100 training samples. The DSTC2 dataset is a human-machine task-oriented dataset that may include a certain system response noise. It has 1,612/506/1117 dialogues for train, validation, and test sets, respectively. In some cases, the original dialogue act labels can be mapped to universal dialogue acts, which results in 19 different system dialogue acts. GSIM is a human-rewrote machine-machine task-oriented corpus, including 1500/469/1039 dialogues for the train, validation, and test sets, respectively. In some cases, two of its domains, movie and restaurant domains, may be combined into one single corpus. GSIM is collected by Machines Talking To Machines (M2M) approach, a functionality-driven process combining a dialogue self-play step and a crowd-sourcing step. In some cases, its dialogue act labels may be mapped to universal dialogue acts, resulting in 13 different system dialogue acts.

Additional examples of task-oriented datasets include Stanford multi-domain dialogue (SMD), Frames, Wizard-of-Oz (WOZ) and Cambridge restaurant dialogue domain dataset (Cam-Rest676). SMD is an in-car personal assistant dataset, comprising 3,301 dialogues and three domains: calendar scheduling, weather information retrieval, and point-of-interest navigation. It is designed to smoothly interface with knowledge bases, where a knowledge snippet is attached with each dialogue as a piece of simplified database information. WOZ and Cam-Rest676 use the same data collection procedure and same ontology as DSTC2, and also use Wizard of Oz style with text input instead of speech input, which can improve a model's capacity for the semantic understanding instead of its robustness to automatic speech recognition errors.

In some embodiments, the afore-mentioned task-oriented datasets may be part of the input 240 that may be provided to the TOD module for pre-training TOD BERT 231. In some embodiments, the dialogues of any of these task-oriented datasets may be processed as discussed above (e.g., including but not limited to converting or flattening dialogues into a flat sequence by using tokens representing user utterances and system responses of the dialogues) and used for pre-training TOD BERT 231. That is, for example, the loss functions $L_{mlm}$ and $L_{rcl}$ may be constructed based on the flattened sequence of dialogues and TOD-BERT 231 may be trained using an optimizer (e.g., an AdamW optimizer) as discussed above. The pre-trained TOD-BERT 231 may be further fine-tuned by updating some or all the model parameters with a gradient clipping to 1.0 using the same hyper-parameters. In some embodiments, the pre-trained (e.g., and fine-tuned) TOD BERT 231 can be used to accomplish one or more downstream tasks such as but not limited to intention detection, dialogue state tracking, dialogue act prediction and/or response selection. For example, the TOD module 230 may include the response selection module 232, the dialogue act prediction module 233, the dialogue state tracking module 234 and the intent detection module 235 that are configured to execute the respective downstream tasks and generate an output 250.

In some embodiments, the response selection module 232 may be configured to rank system responses and retrieve the most relative system response from a candidate pool. The response selection module 232 uses a dual-encoder approach as discussed in Henderson et al., *Training neural response selection for task-oriented dialogue systems*, Proceedings of the 57th Annual Meeting of the Association for Computational Linguistics, pp. 5392-5404, 2019, the disclosure of which is incorporated by reference herein in its entirety, and computes similarity scores between source X and target Y, using the expression:

$$r_i = Sim(F(X), F(Y_i)) \in \mathbb{R}^1,$$

where $Y_i$ is the i-th response candidate and $r_i$ is its cosine similarity score. In some instances, source X can be truncated and the context lengths may be limited to the most recent 256 tokens. Several system responses may be randomly sampled from the corpus as negative samples. In some cases, such random samples may not be true negative samples.

In some embodiments, the dialogue act prediction module 233 can be configured to intake dialogue history as input and predict a binary result for each possible dialogue act, which may be expressed as:

$$A = \text{Sigmoid}(W_2(F(X))) \in \mathbb{R}^N,$$

where $W_2 \in \mathbb{R}^{d_B \times N}$ is a trainable linear mapping, N is the number of possible dialogue acts, and each value in A is between [0, 1] after a Sigmoid layer. The model is trained with binary cross-entropy loss and the i-th dialogue act is considered as a triggered dialogue act if $A_i > 0.5$. In some instances, the dialogue act prediction module 233 may be configured to classify user utterances and system responses because each may contain multiple dialogue acts. For example, a system response may contain multiple dialogue acts such as but not limited to requesting and informing simultaneously, and in such cases, the dialogue act prediction module 233 may classify the dialogue acts.

In some embodiments, the dialogue state tracking module 234 may be configured to dialogue history X (a sequence of utterances) as input and predict slot values for each (domain, slot) pair at each dialogue turn. In some instances, slots indicate the category of information and values specify the content of information. For example, a user utterance "please give me the name of a hospital in downtown" can be decoded as inform(area, downtown) and request(name), which indicates that the user has specified the value downtown for the slot area and requested another slot name. The probability distribution $S_i^j$ of the j-th (domain, slot) pair over its possible values may be given by the expression:

$$S_i^j = Sim(G_j(F(X)), F(v_i^j)) \in \mathbb{R}^1,$$

$$S_i^j = \text{Softmax}(S_i^j) \in [0,1],$$

where Sim is the cosine similarity function, and the number of slot projection layers |G| is equal to the number of (domain, slot) pairs. In some instances, the model may be trained with cross-entropy loss summed over all the pairs. In some instances, each corresponding value $v_i^j$, the i-th value for the j-th (domain, slot) pair, may be passed into the model and fixed its representation during training. In some embodiments, the dialogue state tracking module 234 can be treated as a multi-class classification problem using a predefined ontology.

In some embodiments, the intent detection module 235 is configured to intake a sentence U and predict one single intent class over I possible intents. The predicted distributions for the intent classes are expressed as $$P_{int} = \text{Softmax}(W_1(F(U)))) \in \mathbb{R}^I,$$

where F is the pre-trained TOD BERT language model 231, $W_1 \in \mathbb{R}^{d_B \times I}$ is a trainable linear mapping and the token [CLS] embeddings are used as the output representation. In some instances, the TOD BERT language model 231 may be trained with cross-entropy loss between the predicted distributions $P_{int}$ and the true intent labels.

As such, upon receiving processed task-oriented datasets as input 240, the TOD Module 230 may use one or more of the TOD BERT language model 231, the response selection module 232, the dialogue act prediction module 233, the dialogue state tracking module 234 and/or the intent detection module 235 to generate output 250 including the afore-mentioned scores, predictions, probability distributions, etc. In some implementations, processing task-oriented datasets includes but is not limited to converting or flattening dialogues of the task-oriented datasets into a flat sequence by using tokens representing user utterances and system responses of the dialogues, as discussed above. With respect to the response selection module 232, for example, the response selection module 232 may receive systems responses of task-oriented datasets as input 240 and generate as output 250 a similarity score comparing a pair of system responses of the received system responses. As another example, the dialogue act prediction module 233 may receive dialogue history (e.g., user utterances) of task-oriented datasets as input 240 and generate as output 250 a probabilistic prediction for the next dialogue act to the dialogue history. The dialogue state tracking module 234 may receive dialogue history (e.g., user utterances) of task-oriented datasets as input 240 and generate as output 250 a probability distribution for a (domain, slot) pair of a dialogue turn of a dialogue in the task-oriented datasets. As yet another example, the intent detection module 235 may receive a sentence U of a dialogue of task-oriented datasets as input 240 and generate a predictive probability about the intent class of the sentence U. The TOD module 330, the TOD BERT language model 231, the response selection module 232, the dialogue act prediction module 233, the dialogue state tracking module 234 and/or the intent detection module 235 may be implemented using hardware, software, and/or a combination of hardware and software.

Figure 3:
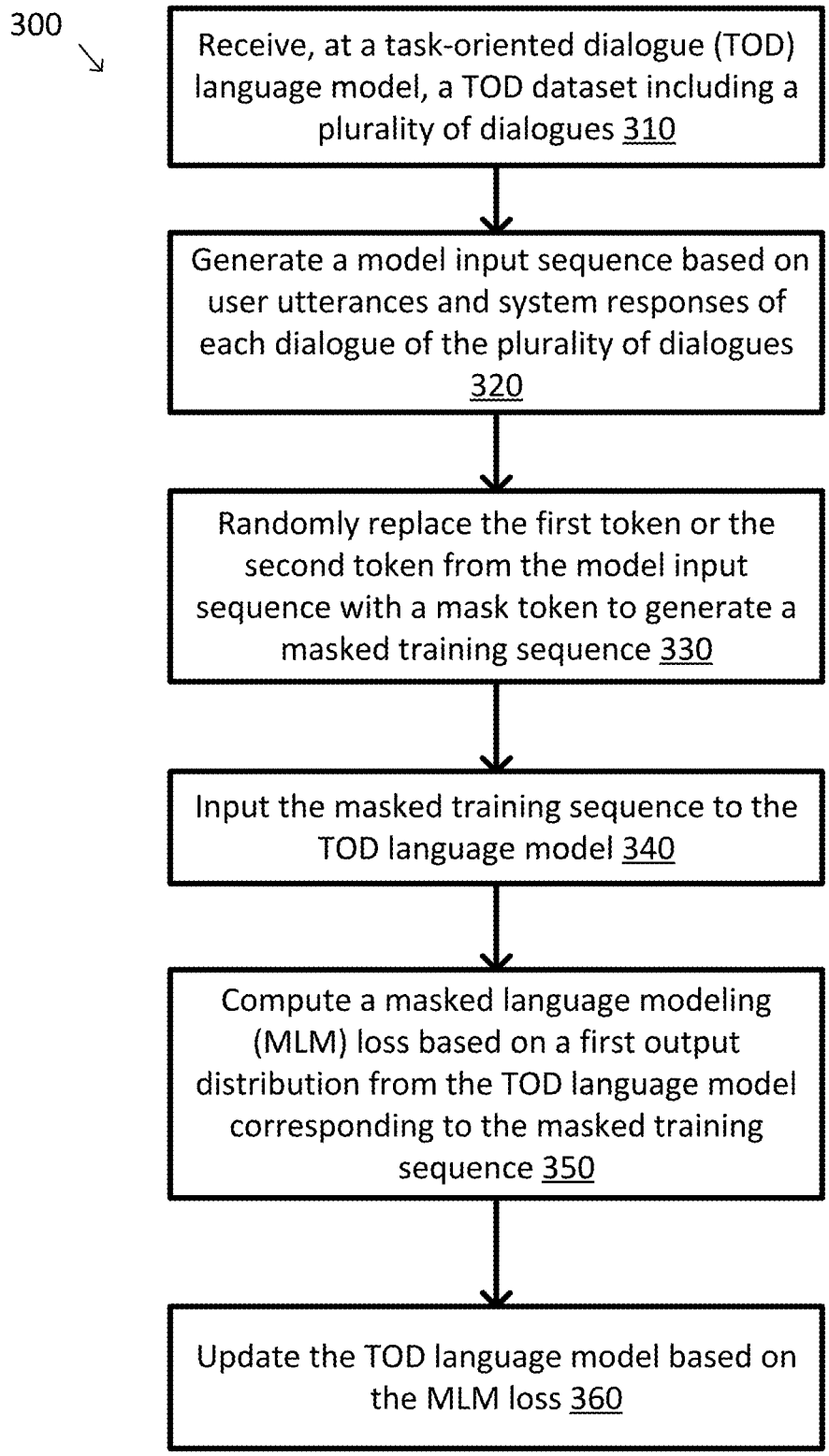
FIG. 3 is a simplified logic flow diagram illustrating a method for training TOD language models with task-oriented datasets, according to some embodiments.

FIG. 3 is a simplified logic flow diagram illustrating a method for training TOD language models with task-oriented datasets, according to some embodiments. One or more of the processes 310-360 of method 300 may be implemented, at least in part, in the form of executable code stored on non-transitory, tangible, machine-readable media that when run by one or more processors may cause the one or more processors to perform one or more of the processes 310-360. In some embodiments, method 300 may correspond to the method used by the module 230 in FIG. 2.

At process 310, a task-oriented dialogue (TOD) language model may receive a TOD dataset including a plurality of dialogues, each dialogue of the plurality of dialogues including a plurality of user utterances and a plurality of system responses.

At process 320, a model input sequence may be generated by, among other things, prefixing a first token to each user utterance of the plurality of user utterances and a second token to each system response of the plurality of system responses, and concatenating each of the prefixed user utterances and each of the prefixed system responses.

At process 330, the first token or the second token from the model input sequence may be randomly replaced with a mask token to generate a masked training sequence.

At process 340, the masked training sequence may be provided or input to the TOD language model.

At process 350, a masked language modeling (MLM) loss may be computed based on a first output distribution from the TOD language model corresponding to the masked training sequence.

At process 360, the TOD language model may be updated based on the MLM loss.

In some aspects of method 300, the method 300 may further comprise selecting a first set of dialogues from the plurality of dialogues. Further, the method 300 may comprise splitting each dialogue of the first set of dialogues at a random turn into a first part of that dialogue and the second part of that dialogue to generate a second set of dialogues and a third set of dialogues, the second set of dialogues including the first part of each dialogue of the first set of dialogues and the third set of dialogues including the second part of each dialogue of the first set of dialogues. Further, the method 300 may comprise inputting the second set of dialogues and the third set of dialogues to the TOD language model; and computing a response contrastive loss (RCL) metric based on a second output distribution from the TOD language model corresponding to the second set of dialogues and the third set of dialogues, wherein updating the TOD language model based on the MLM loss metric includes updating the TOD language model based on a combination of the MLM loss metric and the RCL metric. In some aspects, the combination of the MLM loss metric and the RCL metric is a weighted sum of the MLM loss metric and the RCL metric.

In some aspects, the TOD language model is built using a bidirectional encoder representations from transformers (BERT)-based language representation model. In some aspects, the method 300 further comprises identifying, using the TOD language model, an intent class of a user utterance of the plurality of user utterances. In some aspects, the method 300 further comprises determining, using the TOD language model, a belief state of a dialogue of the plurality of dialogues. In some aspects, the method 300 further comprises predicting, using the TOD language model, a dialogue act of a dialogue of the plurality of dialogues. In some aspects, the method 300 further comprises selecting, using the TOD language model and for a user utterance from the plurality of user utterances, a system response from the plurality of system responses that is responsive to the user utterance.

FIGS. 4-8 shows example illustrations of performance comparison between various language models including TOD language models trained on task-oriented datasets with respect to multiple downstream tasks, according to some embodiments. For example, FIGS. 4-8 show performance comparison results of experiments conducted with respect to the downstream task of response selection, dialogue act prediction, dialogue state tracking, intent detection, and multiple downstream tasks, respectively. For each downstream task, the experiments are conducted using the whole dataset, and the few-shot setting is simulated. Each few-shot experiment is run at least three times with different random seeds to reduce the variance of data sampling, and mean and standard deviations for these limited data scenarios are shown in the figure for the corresponding downstream task. The experiments or computations are performed for two versions of TOD-BERT, where the first version uses only the MLM loss objective function during pretraining (referred hereinafter as "TOD-BERT-mlm"), and the second version uses the MLM and RCL objective functions jointly during pretraining (referred hereinafter as "TOD-BERT-jnt"). FIGS. 4-8 show the results of the experiments with TOD-BERT-mlm and TOD-BERT-jnt in comparison to BERT and other baselines, including two other pretraining models and DialoGPT, discussed in Radford et al., *Language models are unsupervised multitask learners*, 2018, and Zhang et al., *Dialogpt: Large-scale generative pre-training for conversational response generation*, arXiv:1911.00536, 2019, the disclosures of both of which are incorporated by reference herein in their entireties, respectively. In some cases, for a GPT-based model, mean pooling of its hidden states is used as its output representation, in contrast to using only the last token.

For example, FIG. 4 shows an example data table illustrating performance comparison between various language models including TOD language models trained on task-oriented datasets with respect to the downstream task of response selection, according to one embodiment. FIG. 4 includes response selection evaluation results using the k-to-100 metric (with k=1 and 3) on three corpora, MWOZ dataset, DSTC2 dataset and GSIM dataset for 1%, 10% and full data setting. The k-of-100 metric can be computed using a random batch of 100 examples so that responses from other examples in the same batch can be used as random negative candidates, which may allow efficient computations of the metric across many examples in batches. In some cases, the random negatives may be "true" negatives. The example results in FIG. 4 are average results obtained when five different random seeds are run to sample batches during interference.

FIG. 4 shows that TOD-BERT-jnt achieves the best experimental results for response selection in comparison to other models that were run during the experiments, such as BERT, GPT2, DialoGPT and TOD-BERT-mlm, in some embodiments. For example, TOD-BERT-jnt achieves 65.8% 1-to-100 accuracy and 87.0% 3-to-100 accuracy on MWOZ which surpasses BERT by 18.3% and 11.5%, respectively. Similar results hold with respect to DSTC2 and GSIM datasets, where TOD-BERT-jnt achieves higher accuracy than the other noted models. Further, the results of TOD-BERT-jnt are relatively even higher than the other models for few-shot scenarios (versus when full datasets are used, for example). In some cases, it was found that the response selection results could be sensitive to the training batch size since the larger the batch size the harder the prediction can be. In the experiments in FIG. 4, the batch size equals to 25 for all the models.

FIG. 5 shows an example data table illustrating performance comparison between various language models including TOD language models trained on task-oriented datasets with respect to the downstream task of dialogue act prediction, according to one embodiment. FIG. 5 illustrates that TOD-BERT achieves the best experimental results for dialogue act prediction in comparison to BERT and other baselines models such as the multilayer perceptron (MLP) model, the recurrent neural network (RNN) model, GPT2 and DialoGPT. The experiments are performed on three different datasets and FIG. 5 shows the evaluation metrics, micro averaged F1 (micro-$F_1$) and macro averaged $F_1$ (macro-F1) scores evaluating the classification performance of the respective models with respect to the dialogue act prediction task, a multi-label classification problem. In running the experiments, for the MWOZ dataset, the domain information was removed from the original system dialogue act labels, for example, the "taxi-inform" may be simplified to "inform". This process could reduce the number of possible dialogue acts from 31 to 13. For DSTC2 and GSIM corpora, universal dialogue act mapping that maps the original dialogue act labels to a general dialogue act format was applied, resulting in 19 and 13 system dialogue acts in DSTC2 and GSIM, respectively. The baseline RNN and MLP models were also run for comparison purposes. The MLP model takes bag-of-word embeddings to make dialogue act prediction, and the RNN model is a bi-directional GRU network.

As illustrated in FIG. 5, in full data setting, TOD-BERT consistently works better than BERT and other baselines, regardless of the datasets used to test the models or whichever evaluation metric is used to evaluate the performance of the models. In the few-shot experiments, TOD-BERT-mlm outperforms BERT by about 3.5% micro-F1 and about 6.6% macro-F1 on MWOZ corpus in the 1% data scenario. FIG. 5 also illustrates that about 10% of training data can achieve good performance that is close to the full data training.

FIG. 6 shows an example data table illustrating performance comparison between various language models including TOD language models trained on task-oriented datasets with respect to the downstream task of dialogue state tracking, according to one embodiment. In some embodiments, performances of language models with respect to dialogue state tracking tasks may be evaluated using evaluation metrics such as but not limited to joint goal accuracy and slot accuracy. In some embodiments, joint goal accuracy may compare the predicted dialogue states to the ground truth at each dialogue turn, where the ground truth may include slot values for all of the possible (domain, slot) pairs. The output may be considered as a correct prediction if and only if all the predicted values exactly match its ground truth values. The slot accuracy, on the other hand, individually compares each (domain, slot, value) triplet to its ground truth label.

FIG. 6 depicts a result of an experiment comparing BERT and TOD-BERT for dialogue state tracking using the MWOZ 2.1 dataset, where it is shown that TOD-BERT-jnt has an about 2.4% joint goal accuracy improvement over BERT. The results also show that for few-shot experiments using 1% (e.g., which may include about 84 dialogues), 5%, 10% and 25% data, TOD-BERT (i.e., both TOD-BERT-mlm and TOD-BERT-jnt) outperform BERT in all the settings, illustrating the strength of task-oriented dialogue pre-training. A new ontology of all the possible annotated values was created during the experiment. FIG. 6 also shows that TOD-BERT-jnt has better joint goal accuracy and slot accuracy than several other well-known dialogue state trackers, including DSTReader, HyST, TRADE, and ZSDST.

FIG. 7 shows an example data table illustrating performance comparison between various language models including TOD language models trained on task-oriented datasets with respect to the downstream task of intent detection, according to one embodiment. In some embodiments, the performance comparison indicates that TOD-BERT outperforms BERT and other strong baselines such as but not limited to GPT2, DialoGPT, etc., when applied to one of the largest intent detection datasets, the OOS dataset. The results of the performance comparison include intent detection accuracy on all the data of the OOS dataset ("Acc(all)"), on only the in-domain intents of the OOS dataset ("Acc(in)") and on only the out-of-scope intent of the OOS dataset ("Acc(out)"). In some embodiments, out-of-scope intent may be predicted by, among other things, treating out-of-scope intent as an additional class. In some embodiments, out-of-scope intent may be predicted by, among other things, setting a threshold for prediction confidence. FIG. 7 shows results where the out-of-scope intent is predicted by treating out-of-scope intent as an additional class, where TOD-BERT-jnt achieves the highest in-scope and out-of-scope accuracy. Further, for 1-shot and 10-shot experiments conducted by randomly sampling one and ten utterances from each intent class in the training set, TOD-BERT-jnt has about 13.2% all-intent accuracy improvement and about 16.3% in-domain accuracy improvement compared to BERT in the 1-shot setting.

FIG. 8 shows an example data table illustrating performance comparison between various language models including TOD language models trained on task-oriented datasets with respect to multiple downstream tasks, according to one embodiment. That is, FIG. 8 illustrates the feature extracting capabilities of pre-trained models such as GPT2, DialoGPT, BERT TOD-BERT-mlm and TOD-BERT-jnt prior to the fine-tuning of each model, where probing methods were used to determine what information is carried intrinsically by the learned embeddings. In some embodiments, an output representation of a pre-trained model was probed by using one single-layer perceptron on top of a "fixed" pre-trained language model, and only that layer was fine-tuned for a downstream task with the same hyperparameters. The probing results in FIG. 8 show domain classification accuracy on the MWOZ dataset, intent identification accuracy on OOS, and F1-micro evaluation metric for dialogue act prediction on the MWOZ dataset, for each of GPT2, DialoGPT, BERT TOD-BERT-mlm and TOD-BERT-jnt, where TOD-BERT-jnt achieves the highest performance for each tested downstream task, illustrating that the representation of TOD-BERT-jnt contains the most useful information compared to the other tested pre-trained models.

FIGS. 9A, 9B, 9C, 10A, 10B, 10C, 11A, 11B, and 11C show example diagrams visualizing performance comparison with respect to a task-oriented test data between various language models including TOD language models trained on task-oriented datasets, according to one embodiment. The diagrams present visual illustration of the embeddings of BERT, TOD-BERT-mlm, and TOD-BERT-jnt given the same input from the MWOZ test dataset. In some aspects, each sample point identifies a system response representation, which may be passed through a pretrained model and its high-dimension features reduced to a two-dimension point using t-distributed stochastic neighbor embedding (tSNE) for dimension reduction. Because the true domain and dialogue act labels for each utterance are known, different domains and different dialogue acts may be represented separately. In some aspects, FIGS. 9A, 9B, 9C, 10A, 10B, 10C, 11A, 111B, and 11C show that, comparing BERT, TOD-BERT-mlm, and TOD-BERT-jnt, the different domains and different dialogue acts may have the best defined boundaries when the pre-trained model is TOD-BERT-jnt, followed by TOD-BERT-mlm and then BERT, illustrating that TOD-BERT performs better than BERT.

Figure 9A:
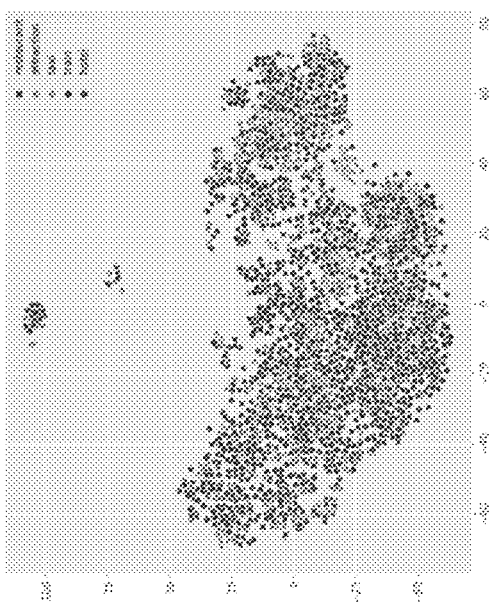
FIGS. 9A, 9B, 9C, 10A, 10B, 10C, 11A, 11B, and 11C show example diagrams visualizing performance comparison with respect to a task-oriented test data between various language models including TOD language models trained on task-oriented datasets, according to one embodiment.
Figure 9B:
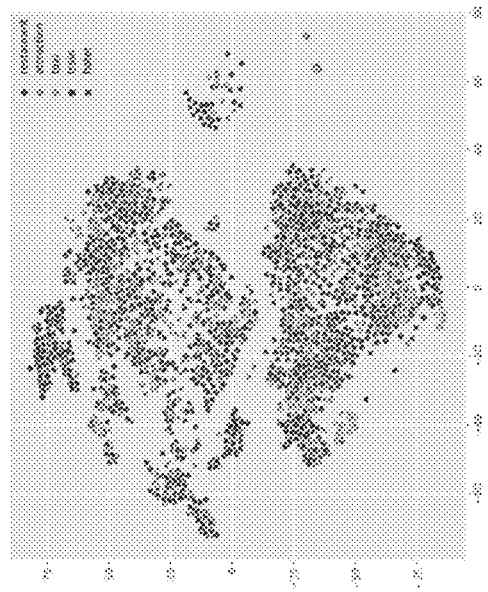
Figure 9C:
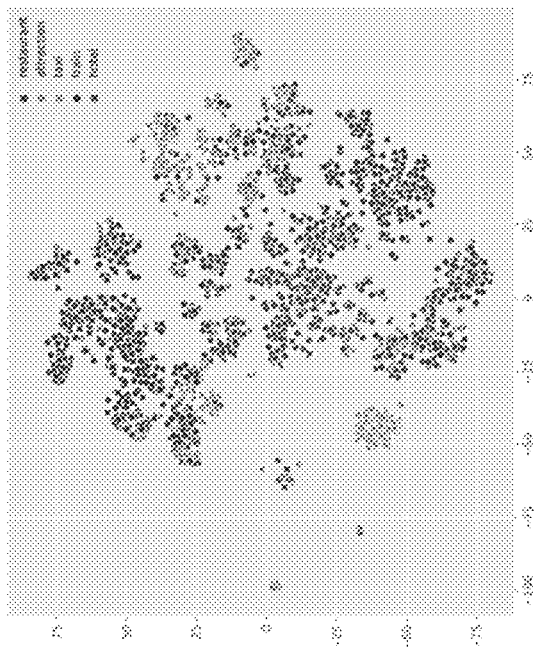
Figure 10A:
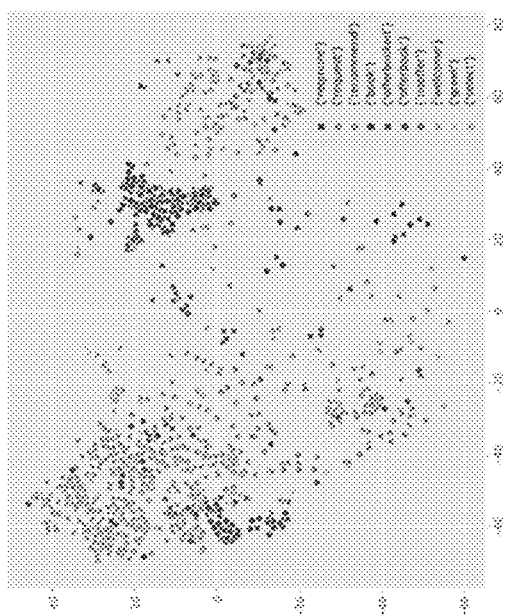
Figure 10B:
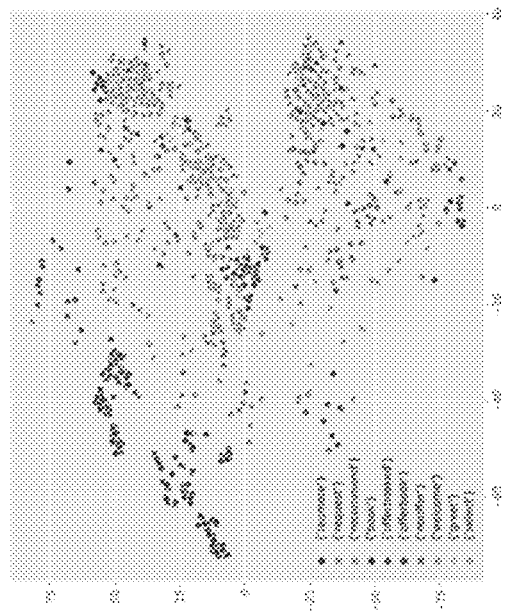
Figure 10C:
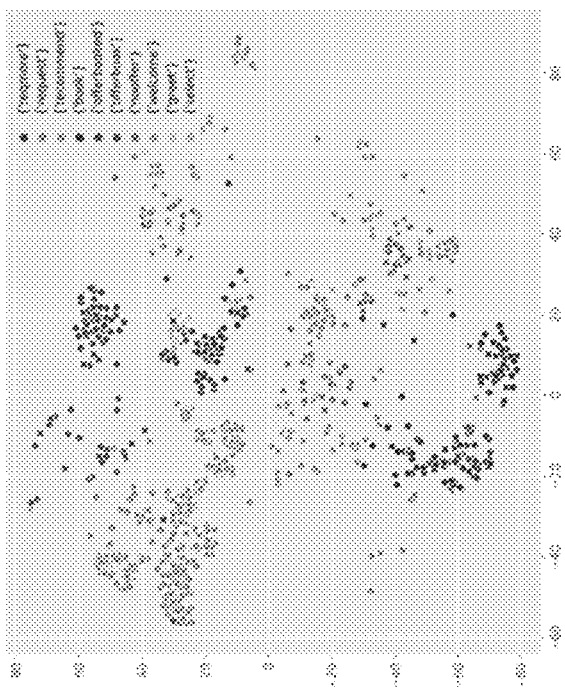
Figure 11A:
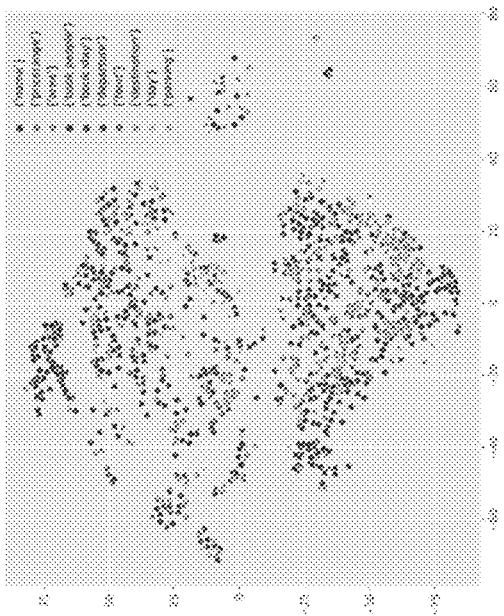
Figure 11B:
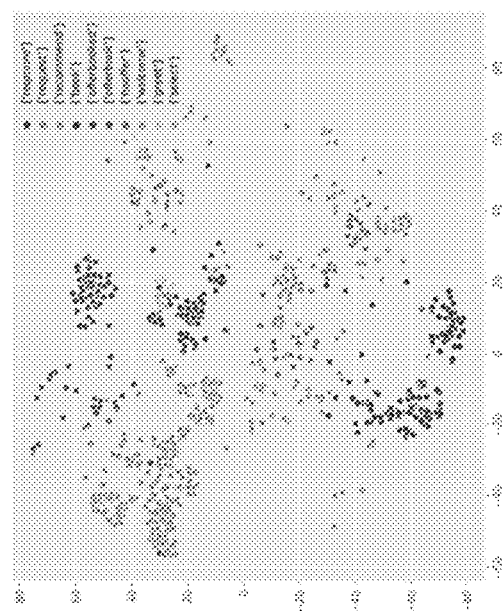
Figure 11C:
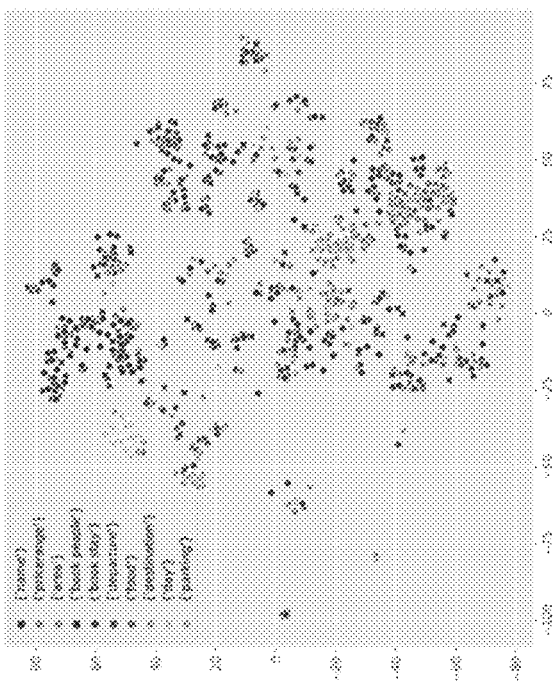

For example, FIGS. 9A-9C show tSNE visualizations of BERT, TOD-BERT-mlm and TOD-BERT-jnt representations, respectively, of system responses in a MWOZ test set for the domains "restaurant", "attraction", "taxi", "train" and "hotel", in some embodiments. Visual inspection of the figures indicates that the domains have more defined or sharper boundaries for the TOD-BERT-jnt representations of system responses than those of TOD-BERT-mlm, which in turn has more defined or sharper boundaries between the different domains when compared to those of BERT. Further, FIGS. 10A-10C show tSNE visualizations of BERT, TOD-BERT-mlm and TOD-BERT-jnt representations, respectively, of system responses in a MWOZ test set for the dialogues acts such as but not limited to "request", "recommend", "welcome", "greet", "select", etc., in some embodiments. Here also, visual inspection of the figures indicates that the different dialogue acts have more defined or sharper boundaries for the TOD-BERT-jnt representations of system responses than those of TOD-BERT-mlm, which in turn has more defined or sharper boundaries between the different dialogue acts when compared to those of BERT. In addition, FIGS. 11A-11C show tSNE visualizations of BERT, TOD-BERT-mlm and TOD-BERT-jnt representations, respectively, of system responses in a MWOZ test set for the dialogues slots such as but not limited to "name", "area", "departure", "food", "parking", etc., in some embodiments.

once again, visual inspection of the figures indicates that the different dialogue slots have more defined or sharper boundaries for the TOD-BERT-jnt representations of system responses than those of TOD-BERT-mlm, which in turn has more defined or sharper boundaries between the different dialogue slots when compared to those of BERT. As such, FIGS. 9A, 9B, 9C, 10A, 10B, 10C, 11A, 11B, and 11C illustrate that TOD-BERT pre-trained model provides improved results or performance over BERT in downstream task oriented dialogue applications.

Some examples of computing devices, such as computing device 200 may include non-transitory, tangible, machine readable media that include executable code that when run by one or more processors (e.g., processor 210) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method, comprising:
receiving, at a task-oriented dialogue (TOD) language model, a TOD dataset including a plurality of dialogues, each dialogue of the plurality of dialogues including a plurality of user utterances and a plurality of system responses;
generating a model input sequence by:
prefixing a first token to each user utterance of the plurality of user utterances and a second token to each system response of the plurality of system responses, and
concatenating each of the prefixed user utterances and each of the prefixed system responses;
randomly replacing the first token or the second token from the model input sequence with a mask token to generate a masked training sequence;
inputting the masked training sequence to the TOD language model;
computing a masked language modeling (MLM) loss based on a first output distribution from the TOD language model corresponding to the masked training sequence;
splitting each dialogue from the plurality of dialogues at a respective random turn into a context of the respective dialogue and a response of the respective dialogue;
encoding, by the TOD language model, respective contexts and respective responses corresponding to the plurality of dialogues into a context matrix and a response matrix, respectively;
computing a response contrastive loss (RCL) based on the context matrix and the response matrix generated from the plurality of dialogues; and
updating the TOD language model based on a combination of the MLM loss and the RCL.

2. The method of claim 1, wherein the context comprises system responses and user utterances prior to a randomly selected dialogue turn, and the response comprises a system response of a next dialogue turn, and the RCL is computed by taking a softmax operation over a product of the content matrix and the response matrix and summing softmax results over the plurality of dialogues.

3. The method of claim 2, wherein the combination of the MLM loss and the RCL is a weighted sum of the MLM loss and the RCL.

4. The method of claim 1, wherein the TOD language model is built using a bidirectional encoder representations from transformers (BERT)-based language representation model.

5. The method of claim 1, further comprising: identifying, using the TOD language model, an intent class of a user utterance of the plurality of user utterances.

6. The method of claim 1, further comprising: determining, using the TOD language model, a belief state of a dialogue of the plurality of dialogues.

7. The method of claim 1, further comprising: predicting, using the TOD language model, a dialogue act of a dialogue of the plurality of dialogues.

8. The method of claim 1, further comprising: selecting, using the TOD language model and for a user utterance from the plurality of user utterances, a system response from the plurality of system responses that is responsive to the user utterance.

9. A system, comprising:
a memory storing instructions for training a task-oriented dialogue (TOD) language model; and
a processor configured to read and execute the instructions from the memory to:
receive, at the TOD language model, a TOD dataset including a plurality of dialogues, each dialogue of the plurality of dialogues including a plurality of user utterances and a plurality of system responses;
generate a model input sequence by:
prefixing a first token to each user utterance of the plurality of user utterances and a second token to each system response of the plurality of system responses, and
concatenating each of the prefixed user utterances and each of the prefixed system responses;
randomly replace the first token or the second token from the model input sequence with a mask token to generate a masked training sequence;
input the masked training sequence to the TOD language model;
compute a masked language modeling (MLM) loss based on a first output distribution from the TOD language model corresponding to the masked training sequence;
split each dialogue from the plurality of dialogues at a respective random turn into a context of the respective dialogue and a response of the respective dialogue;
encode, by the TOD language model, respective contexts and respective responses corresponding to the plurality of dialogues into a context matrix and a response matrix, respectively;
compute a response contrastive loss (RCL) based on the context matrix and the response matrix generated from the plurality of dialogues; and
update the TOD language model based on a combination of the MLM loss and the RCL.

10. The system of claim 9, wherein the context comprises system responses and user utterances prior to a randomly selected dialogue turn, and the response comprises a system response of a next dialogue turn, and the RCL is computed by taking a softmax operation over a product of the content matrix and the response matrix and summing softmax results over the plurality of dialogues.

11. The system of claim 10, wherein the combination of the MLM loss and the RCL is a weighted sum of the MLM loss and the RCL.

12. The system of claim 9, wherein the TOD language model is built using a bidirectional encoder representations from transformers (BERT)-based language representation model.

13. The system of claim 9, wherein the processor is further configured to read and execute the instructions from the memory to identify, using the TOD language model, an intent class of a user utterance of the plurality of user utterances.

14. The system of claim 9, wherein the processor is further configured to read and execute the instructions from the memory to determine, using the TOD language model, a belief state of a dialogue of the plurality of dialogues.

15. The system of claim 9, wherein the processor is further configured to read and execute the instructions from the memory to predict, using the TOD language model, a dialogue act of a dialogue of the plurality of dialogues.

16. The system of claim 9, wherein the processor is further configured to read and execute the instructions from the memory to select, using the TOD language model and for a user utterance from the plurality of user utterances, a system response from the plurality of system responses that is responsive to the user utterance.

17. A non-transitory computer-readable medium (CRM) having stored thereon machine-readable instructions executable to cause a processor to perform operations comprising:
receiving, at a task-oriented dialogue (TOD) language model, a TOD dataset including a plurality of dialogues, each dialogue of the plurality of dialogues including a plurality of user utterances and a plurality of system responses;

generating a model input sequence by:
  (i) prefixing a first token to each user utterance of the plurality of user utterances and a second token to each system response of the plurality of system responses, and
  (ii) concatenating each of the prefixed user utterances and each of the prefixed system responses;

randomly replacing the first token or the second token from the model input sequence with a mask token to generate a masked training sequence;

inputting the masked training sequence to the TOD language model;

computing a masked language modeling (MLM) loss based on a first output distribution from the TOD language model corresponding to the masked training sequence;

splitting each dialogue from the plurality of dialogues at a respective random turn into a context of the respective dialogue and a response of the respective dialogue;

encoding, by the TOD language model, respective contexts and respective responses corresponding to the plurality of dialogues into a context matrix and a response matrix, respectively;

computing a response contrastive loss (RCL) based on the context matrix and the response matrix generated from the plurality of dialogues; and updating the TOD language model based on a combination of the MLM loss and the RCL.

18. The non-transitory CRM of claim 17, wherein the context comprises system responses and user utterances prior to a randomly selected dialogue turn, and the response comprises a system response of a next dialogue turn, and the RCL is computed by taking a softmax operation over a product of the content matrix and the response matrix and summing softmax results over the plurality of dialogues.

19. The non-transitory CRM of claim 18, wherein the combination of the MLM loss and the RCL is a weighted sum of the MLM loss and the RCL.

20. The non-transitory CRM of claim 17, wherein the TOD language model is built using a bidirectional encoder representations from transformers (BERT)-based language representation model.

21. The non-transitory CRM of claim 17, wherein the operations further comprise identifying, using the TOD language model, an intent class of a user utterance of the plurality of user utterances.

22. The non-transitory CRM of claim 17, wherein the operations further comprise determining, using the TOD language model, a belief state of a dialogue of the plurality of dialogues.

23. The non-transitory CRM of claim 17, wherein the operations further comprise predicting, using the TOD language model, a dialogue act of a dialogue of the plurality of dialogues.

24. The non-transitory CRM of claim 17, wherein the operations further comprise selecting, using the TOD language model and for a user utterance from the plurality of user utterances, a system response from the plurality of system responses that is responsive to the user utterance.

* * * * *